United States Patent
Gaspar et al.

(10) Patent No.: US 12,334,719 B2
(45) Date of Patent: Jun. 17, 2025

(54) TURBINE ENGINE COMPRISING IMPROVED HARNESS SUPPORT MEANS

(71) Applicant: SAFRAN AIRCRAFT ENGINES, Paris (FR)

(72) Inventors: Patrice Gaspar, Moissy-Cramayel (FR); Samy Alexandre Hoballah, Moissy-Cramayel (FR); Cyrille François Antoine Mathias, Moissy-Cramayel (FR); Khy Tan, Moissy-Cramayel (FR); Edouard Thebaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 149 days.

(21) Appl. No.: 18/246,519

(22) PCT Filed: Sep. 28, 2021

(86) PCT No.: PCT/FR2021/051666
§ 371 (c)(1),
(2) Date: Mar. 24, 2023

(87) PCT Pub. No.: WO2022/064160
PCT Pub. Date: Mar. 31, 2022

(65) Prior Publication Data
US 2023/0369838 A1    Nov. 16, 2023

(30) Foreign Application Priority Data
Sep. 28, 2020    (FR) ........................................ 2009815

(51) Int. Cl.
*F01D 25/24*    (2006.01)
*F16L 3/223*    (2006.01)
*H02G 3/00*    (2006.01)

(52) U.S. Cl.
CPC ............... *H02G 3/26* (2013.01); *F01D 25/24* (2013.01); *F16L 3/2235* (2013.01); *F05D 2260/31* (2013.01)

(58) Field of Classification Search
CPC ....................................................... F01D 9/065
See application file for complete search history.

(56) References Cited

U.S. PATENT DOCUMENTS 10,329,935 B2 *    6/2019    Gaudry ................... F01D 9/065
10,641,115 B2 *    5/2020    Colebrook ................ F01D 9/06
(Continued)

FOREIGN PATENT DOCUMENTS

| | | |
|---|---|---|
| FR | 2 996 070 A1 | 3/2014 |
| WO | WO 2014/188122 A1 | 11/2014 |
| WO | WO 2015/092308 A1 | 6/2015 |

OTHER PUBLICATIONS

International Search Report issued Dec. 20, 2021 in PCT/FR2021/051666 filed on Sep. 28, 2021 2 pages.

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

An aircraft turbine engine with a main axis includes: an arm that is radial with respect to the main axis, extending through an air flow duct; a support wall belonging to the radial arm and which has two openings; a plurality of electric harnesses extending partially through the radial arm and for which a section of each harness is secured to the support wall of the arm; and two mounting blocks, in which each mounting block is associated with a group of sections of harness.

10 Claims, 4 Drawing Sheets

(56) References Cited

U.S. PATENT DOCUMENTS

2016/0193753 A1     7/2016   Stoliaroff-Pepin
2016/0348520 A1    12/2016   Gaudry et al.

\* cited by examiner

TURBINE ENGINE COMPRISING IMPROVED HARNESS SUPPORT MEANS

TECHNICAL FIELD

The invention relates to a turbine engine including simplified means for assembling electrical harnesses to a radial support arm.

PRIOR ART

An aircraft turbine engine includes a plurality of electrical cables and hoses which are intended to connect components of the turbine engine located at one location, either to other components, or to sources of electrical energy or sources of a fluid circulating in the hoses.

To secure routing of these electrical cables and of these pipes, it is known to use harnesses, in which the cables and the hoses are grouped together.

In turn, these harnesses are fastened to a fixed structure of the turbine engine, by means of mounting blocks.

According to an embodiment of a mounting block, the latter is made into three portions which are tightened in pairs on either side of aligned harness sections.

The assembly of the portions of the mounting block with the harnesses is relatively complex because a first group of harness sections should be fastened to the mounting block before fastening the rest of the harness sections.

The difficulty of the assembly is even greater as the mounting block should be assembled with the harnesses after the passage of the harnesses throughout openings formed in the fixed structure.

The different assemblies are performed by screwing the portions of the block to each other and on the fixed structure, respectively.

However, since the harnesses are already set in place with respect to the fixed structure, accessibility to the fastening screws is difficult.

This results in a risk of poor assembly, reflected by a potential pinching of the harnesses, a poor positioning of the block or an insufficient tightening of the screws.

The invention aims to propose a solution allowing facilitating the connection of the harnesses with the fixed structure of the turbine engine and making it reliable.

DISCLOSURE OF THE INVENTION

The invention proposes an aircraft turbine engine with a main axis A including:
- an arm that is radial with respect to the main axis A extending throughout an air flow duct;
- a support wall belonging to the radial arm and which includes two openings;
- a plurality of harnesses partially extending throughout the radial arm and a section of each harness of which is fastened to said support wall of the arm;
- characterised in that it includes two mounting blocks each mounting block of which is associated with a group of harness sections.

Preferably, the turbine engine includes means for fastening a mounting block on the support wall which are independent of the means for fastening the other mounting block on the support wall.

Preferably, each mounting block is fastened to the support wall by bolting.

Preferably, each mounting block includes a body which is connected to the support wall and a barrel which receives an associated harness section Preferably, the body includes a face which is in contact with the support wall and includes a shoulder projecting with respect to said face of the body, the section of the shoulder being complementary with said opening.

Preferably, the support wall extends in a plane substantially perpendicular to a direction that is radial with respect to the main axis A of the turbine engine, and said face of the body is fastened to a face of the support wall which is radially external with respect to the main axis A of the turbine engine.

Preferably, each mounting block consists of two portions mounted on either side of the harness sections with which the mounting block is associated.

Preferably, the two portions of a mounting block are connected with the associated harness sections before assembly of the mounting block on the support wall.

Preferably, each portion of the mounting block includes a portion of each barrel of said mounting block.

Preferably, the radial arm is located at a 6 o'clock position, by analogy with the dial of a clock.

DETAILED DESCRIPTION OF THE INVENTION

Figure 1:
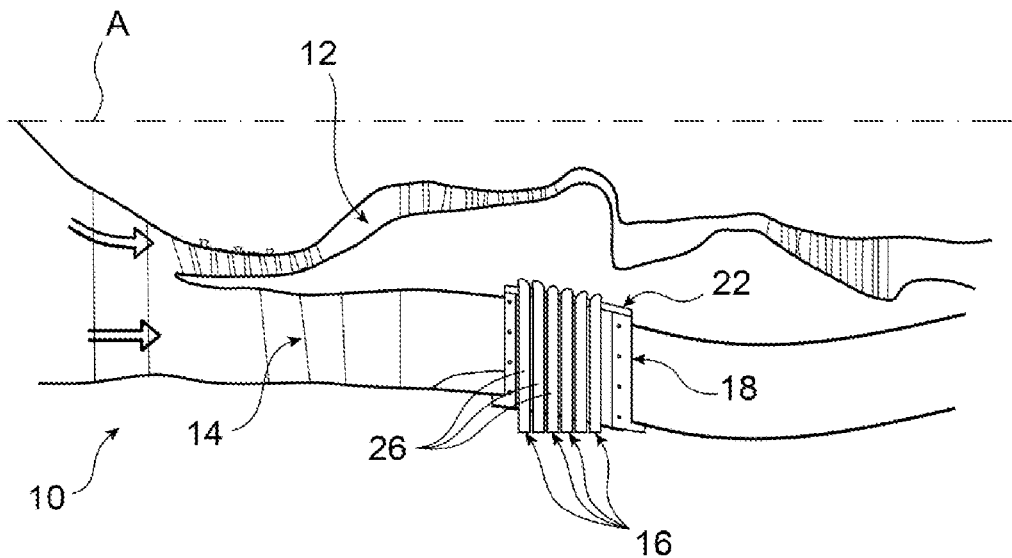
FIG. 1 is a schematic representation in partial section of a turbine engine showing the location of the harness sections to be connected to the support arm.
Figure 2:
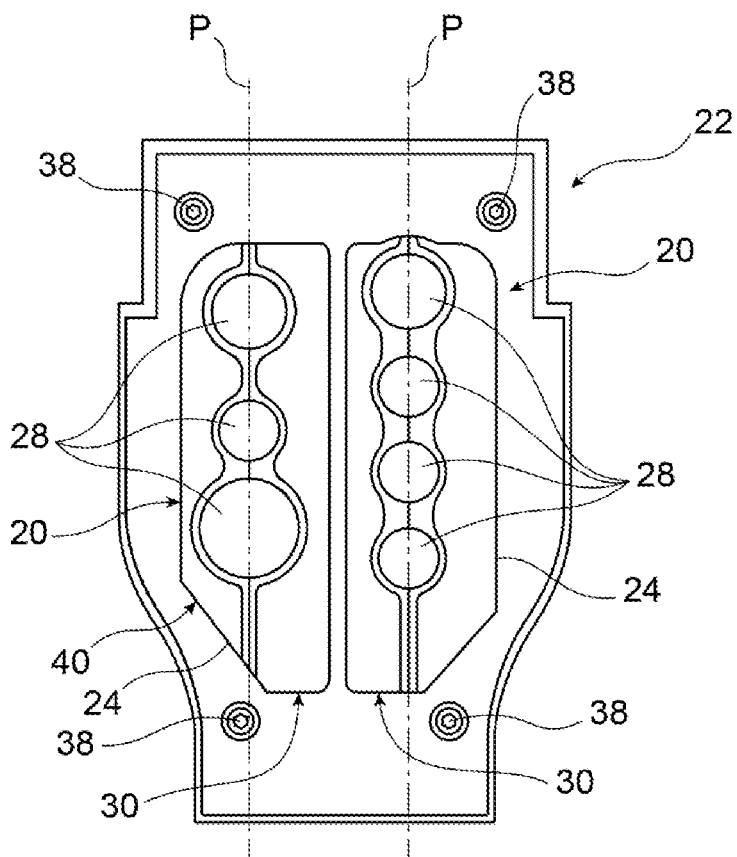
FIG. 2 is a view according to a radial outward direction of the mounting blocks which are assembled on the support wall.
Figure 3:
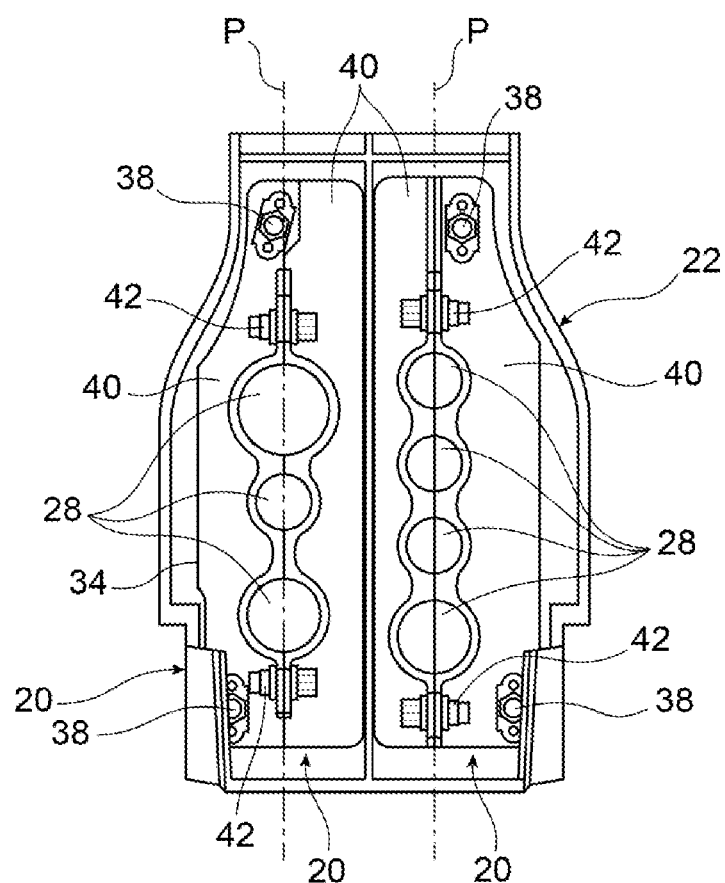
FIG. 3 is a view according to a radial inward direction of the mounting blocks represented in FIG. 2.
Figure 4:
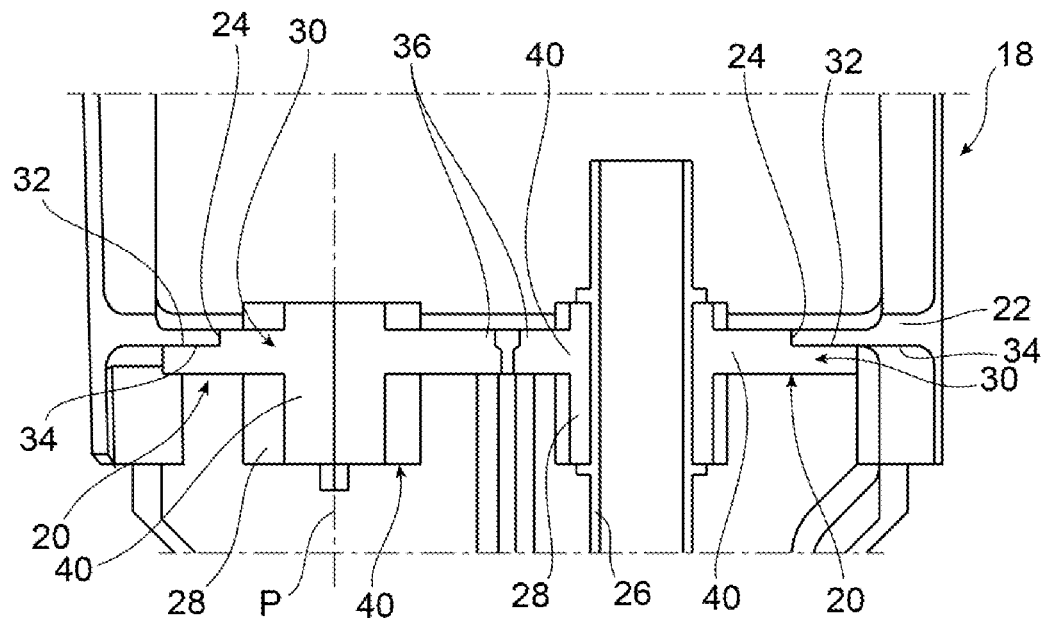
FIG. 4 is a section according to a radial plane perpendicular to the main axis A of the turbine engine showing the two mounting blocks assembled on the support wall.
Figure 5:
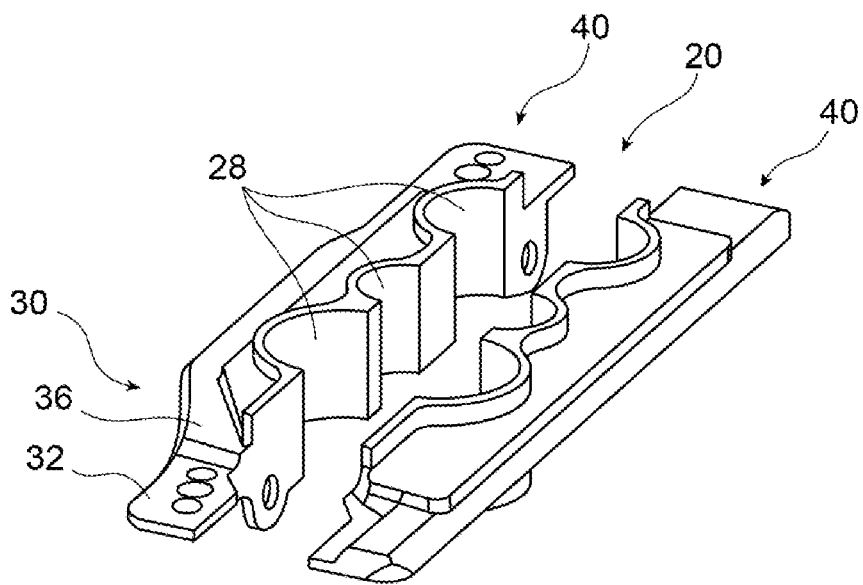
FIG. 5 is a schematic representation in perspective of a mounting block separated into two portions, before assembly thereof with the harness sections.
Figure 6:
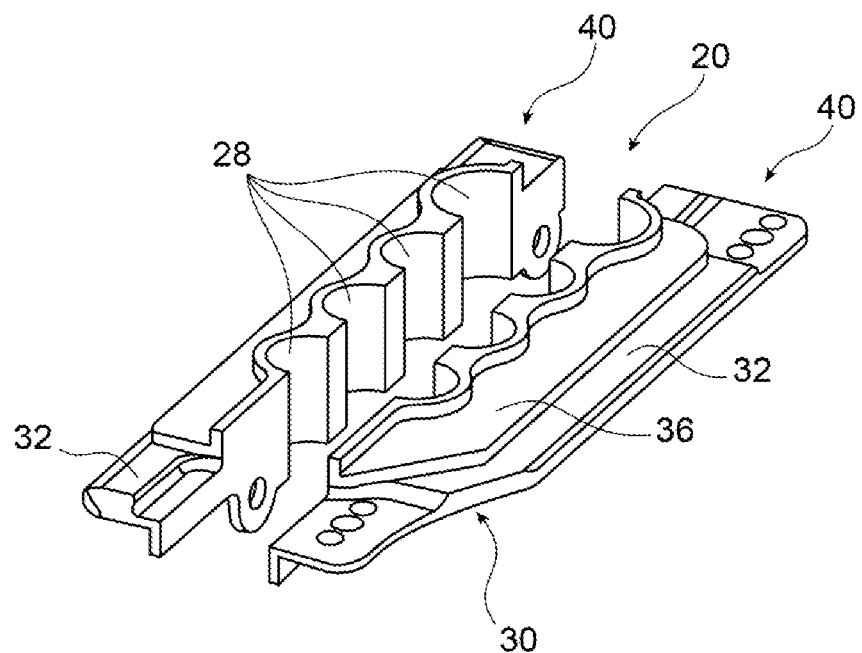
FIG. 6 is a schematic representation in perspective of a mounting block separated into two portions, before assembly thereof with the harness sections.

In FIG. 1, a portion of a turbine engine 10 with a main axis A is represented.

The turbine engine 10 includes a radially internal primary duct 12 for the circulation of a primary air flow and a radially external secondary duct 14 for the circulation of a secondary air flow, the two ducts 12, 14 are coaxial with the axis main A of the turbine engine 10.

The turbine engine 10 includes a plurality of components which are distributed at numerous points and which must be electrically or fluidly connected to other components.

The electrical or fluidic connection of the components is achieved by electrical cables or hoses, respectively, some of which extend throughout either one of the primary duct 12 or the secondary duct 14.

For this purpose, the cables or hoses are grouped together into several groups disposed in sheaths commonly called harnesses 16, which pass through the radial arms 18 extending throughout each duct 12, 14.

The harnesses 16 are held in place at each radial end of a radial arm 18 by the use of mounting blocks 20 which will be described in more detail later on.

Preferably, each radial end of a radial arm 18 includes a support wall 22 which extends perpendicularly to the radial direction of the radial arm 18 and it includes openings 24, herein two in number, throughout which the harnesses 16 extend.

In the following description, reference will be made to a section 26 of each harness 16. This section 26 of a harness 16 is the portion of the harness 16 that extends throughout an opening 24 of the support wall 22 when the harness 16 is mounted in the turbine engine.

The sections 26 of the harnesses 16 are held in position with respect to the support wall 22 by means of the mounting blocks 20.

Each mounting block 20 is associated with an opening 24 of the support wall 22, i.e. herein, two mounting blocks 20 are associated with the support wall and with the harnesses 16 to be fastened thereto.

In the following description, reference will be made to a single mounting block 20. It should be understood that the description of the other mounting block 20 will be deduced from the description of the first mounting block by similarity.

The mounting block 20 includes several barrels 28, each barrel 28 of which is associated with a section 26 of a harness 16 associated with the mounting block 20. The dimensions of each barrel 28, i.e. in particular the diameter thereof is defined according to the diameter of the harness section 26 that is associated therewith.

Furthermore, each section 26 is tightly mounted in the barrel 28 that is associated therewith.

The barrels 28 are located in the opening 24 of the support wall 22 associated with the mounting block 20.

The mounting block 20 also includes an essentially planar body 30 which extends substantially parallel to the plane of the support wall 22 and which is connected to the barrels 28 and to the support wall 22.

The body 30 includes a peripheral face 32 parallel to the plane of the support wall 22, which is located opposite and which is in contact with a contact face 34 of the support wall 22.

The body 30 also includes a shoulder 36 which has a shape complementary with the opening 24 associated with the support wall 22 and which projects with respect to the peripheral face 32.

This shoulder 36 extends inside the opening 24 of the support wall 22 which is associated with the mounting block 20, ensuring a positioning of the mounting block 20 with respect to the support wall 22.

The means for fastening the mounting block 20 on the support wall 22 herein consist of a bolting system 38, which achieves fastening of the mounting block 20 on the support wall 22 by clamping the peripheral face 32 of the body 30 against the contact face 34 of the support wall 22.

Each mounting block 20 is made into two portions 40 which are mounted on either side of the sections 26 of the harnesses 16.

Preferably, each of the two portions 40 of the mounting block 20 includes a portion of each barrel 28 of the mounting block 20, i.e. each barrel is partially formed in each portion 40 of the mounting block 20.

According to a preferred embodiment, the two portions 40 of the mounting block 20 are separated by a parting plane P passing through all barrels 28 of the mounting block 20. Thus, when the two portions 40 are separated from each other, it is possible to insert each section 26 of the harness 16 into a portion of the barrel 28 that is associated therewith. Then, by assembling the two portions 40 to form the mounting block 20, they clamp the sections 26 of the harnesses 16 therebetween.

According to a preferred embodiment, the barrels 28 are aligned with each other, according to a direction parallel to the main plane of the body 30. Thus, the parting plane P is planar and it is parallel to the direction radial with respect to the main axis A.

The two portions 40 of the mounting block 20 are fastened to each other by any known means, for example by bolts 42, these means for fastening the two portions 40 of the mounting block 20 are independent of the means for fastening the mounting block 20 on the support wall 22.

In the embodiment represented in the figures, the support wall 22 includes two openings 24.

Thus, the sections 26 of the harnesses 16 are split into two groups of sections 26, each group of sections 26 of the harnesses 16 of which is associated with an opening 24. Also, the sections 26 of the harnesses 16 of the two groups form two alignments which are parallel to each other.

Each group of sections 26 of the harnesses 16 is fastened to the support wall 22 by means of a mounting block 20 which is associated therewith, i.e. all sections 26 of the harnesses 16 are fastened to the support wall 22 by two mounting blocks 20.

The means for fastening a mounting block 20 on the support wall 22, i.e. herein each bolting system 38, are independent of the means for fastening the other mounting block 20 on the support wall 22.

Thus, it is possible to mount a group of sections 26 of the harnesses 16 on the support wall independently of the other group of sections 26 of the harnesses 16.

As said hereinabove, the two portions 40 of a mounting block 20 are fastened to the sections 26 of the harnesses 16 by bolts 42, which are independent of the means for fastening the mounting block 20 on the support wall 22. Thus, the two portions 40 of the mounting block 20 can be assembled on the sections 26 of the harnesses 16 before fastening the mounting block 20 on the support wall 22.

Thus, a process for assembling all of the sections 26 of the harnesses 16 on the support wall 22 comprises a first phase of linking the sections 26 of the harnesses 16 of each group of sections 26 of the harnesses 16, with the mounting block 20 that is associated therewith to form two subassemblies, a first subassembly including a first group of sections 26 of the harnesses 16 and the mounting block that is associated with this first group of sections 26 of the harnesses 16, the second subassembly including the other group of sections 26 of the harnesses 16 and the mounting block 20 that is associated with this other group of sections 26 of the harnesses 16.

For this purpose, the sections 26 of the harnesses 16 are set in place in the barrel 28 portions of a first portion 40 of the mounting block 20.

Afterwards, the second portion 40 of the mounting block 20 is fastened to the first portion 40 of the mounting block by the bolts 42, the harness sections 16 are then tightened in the mounting block 20.

Upon completion of this first phase, each group of sections 26 of the harnesses 16 is fastened to the mounting block 20 that is associated therewith.

It should be understood that this first phase of connecting the sections 26 of the harnesses 16 may be implemented before or after a phase consisting in making the harnesses 16 pass throughout the openings 24 of the support wall 22.

According to a second phase of the assembly process, the first subassembly, which is formed by the first group of sections 26 of the harnesses 16 and the mounting block 20 which is associated with this first group of sections 26 of the harnesses 16, is fastened to the support wall 22. Afterwards, the second subassembly which is formed by the other group of sections 26 of the harnesses 16 and the mounting block 20 which is associated with this other group of sections 26 of the harnesses 16 is fastened to the support wall 22.

According to this second phase, the body 30 of each mounting block 20 is positioned on the support wall 22 with the shoulder 36 inserted into the associated opening 24. Afterwards, the mounting block 20 is fastened to the support wall 22 by the bolting system 38.

Preferably, the contact face 34 of the support wall 22 on which the peripheral face is brought into contact, is the radially outer face of the support wall 22, with respect to the main axis A of the turbine engine.

Thus, the body 30 of the mounting block 20 is mounted on the support wall 22 according to a radial movement in the direction of the main axis A of the turbine engine. This movement is more natural and easier to perform than a radial outward movement since access to a radially inward side of the support wall 22 is more restricted than access to the radially outer face of the support wall.

During this second phase, each subassembly formed by a group of sections 26 of the harnesses 16 and the mounting block 20 that is associated therewith, is fastened independently of the other subassembly.

This allows facilitating the manoeuvre for the operator in charge of the assembly since he has only one subassembly to handle, the other subassembly being either fastened to the support wall 22 or being at a distance therefrom.

Also, when a maintenance operation on the turbine engine should be carried out on a harness 16, there is only one mounting block 20, and the sections 26 of the harnesses 16 associated therewith, to be dismantled, all manoeuvres are thus herein even easier for the operator than is the case when all harness sections 16 are fastened to one single mounting block.

Moreover, the first phase of linking the sections with the mounting blocks 20 may be implemented at a distance from the support wall 22, which further facilitates handling by the operator who has more space available when he operates at a distance from the support wall 22.

This advantage is all the more important when the radial arm 18 to which the harnesses are fastened is located at the position commonly called 6 o'clock, by analogy with the dial of a clock, i.e. the radial arm 18 that is located in the lower portion of the turbine engine 10 and which is vertical.

This position is particularly difficult to access for an operator. Thus, the assembly of the harness sections 16 with the mounting blocks 20 before mounting thereof on the support wall 22 allows carrying out some operations at a location that is easier to access.

Thus, the risk of damaging the harnesses 16 by tightening the mounting block 20 is reduced since the operator can control the relative positioning of the sections 26 of the harnesses 16 with respect to each portion 40 of the mounting block 20.

The invention claimed is:

1. An aircraft turbine engine with a main axis comprising:
   an arm that is radial with respect to the main axis extending throughout an air flow duct;
   a support wall belonging to the radial arm and which includes two openings;
   a plurality of harnesses partially extending throughout the radial arm and a section of each harness of which is fastened to said support wall of the arm; and
   two mounting blocks, each mounting block of the two mounting blocks is associated with a group of sections of the harnesses.

2. The aircraft turbine engine according to claim 1, further comprising means for fastening a mounting block on the support wall which are independent of the means for fastening the other block of mounting on the support wall.

3. The aircraft turbine engine according to claim 1, wherein each mounting block is fastened to the support wall by bolting.

4. The aircraft turbine engine according to claim 1, wherein each mounting block includes a body which is connected to the support wall and a barrel which receives an associated section of the harness.

5. The aircraft turbine engine according to claim 4, wherein the body includes a face which is in contact with the support wall and includes a shoulder projecting with respect to said face of the body, a section of the shoulder being complementary with said opening.

6. The aircraft turbine engine according to claim 5, wherein the support wall extends in a plane substantially perpendicular to a direction that is radial with respect to the main axis of the aircraft turbine engine, and
   wherein said face of the body is fastened to a face of the support wall which is radially external with respect to the main axis of the aircraft turbine engine.

7. The aircraft turbine engine according to claim 1, wherein each mounting block includes two portions mounted on either side of the sections of the harnesses with which the mounting block is associated.

8. The aircraft turbine engine according to claim 7, wherein the two portions of each mounting block are connected with the associated sections of the harnesses before assembly of the mounting block on the support wall.

9. The aircraft turbine engine according to claim 8, wherein the body includes a face which is in contact with the support wall and includes a shoulder projecting with respect to said face of the body, a section of the shoulder being complementary with an opening, and
   wherein each portion of the mounting block includes a portion of each barrel of said mounting block.

10. The aircraft turbine engine according to claim 9, wherein the radial arm is located at a lower vertical portion of the aircraft turbine engine.

* * * * *